United States Patent
Barone et al.

(10) Patent No.: US 10,880,672 B2
(45) Date of Patent: Dec. 29, 2020

(54) EVIDENCE MANAGEMENT SYSTEM AND METHOD

(71) Applicant: International Business Machines Corporation, Armonk, NY (US)

(72) Inventors: Bryan A. Barone, Orlando, FL (US); Garfield W. Vaughn, South Windsor, CT (US); Boris V. Zatulovsky, Charlton, MA (US)

(73) Assignee: International Business Machines Corporation, Armonk, NY (US)

(*) Notice: Subject to any disclaimer, the term of this patent is extended or adjusted under 35 U.S.C. 154(b) by 304 days.

(21) Appl. No.: 15/882,355

(22) Filed: Jan. 29, 2018

(65) Prior Publication Data
US 2019/0236346 A1 Aug. 1, 2019

(51) Int. Cl.
| | |
|---|---|
| *H04W 4/00* | (2018.01) |
| *H04W 4/02* | (2018.01) |
| *G06K 9/00* | (2006.01) |
| *G06F 16/31* | (2019.01) |
| *G06F 16/332* | (2019.01) |
| *G06F 40/10* | (2020.01) |
| *G06F 40/30* | (2020.01) |
| *G06F 40/216* | (2020.01) |
| *G06F 16/9537* | (2019.01) |
| *H04W 4/38* | (2018.01) |

(Continued)

(52) U.S. Cl.
CPC ............ *H04W 4/02* (2013.01); *G06F 16/313* (2019.01); *G06F 16/3329* (2019.01); *G06F 16/9537* (2019.01); *G06F 40/10* (2020.01); *G06F 40/216* (2020.01); *G06F 40/30* (2020.01); *G06K 9/00442* (2013.01); *H04W 4/38* (2018.02); *G06K 9/00221* (2013.01); *G06N 20/00* (2019.01); *G10L 15/26* (2013.01)

(58) Field of Classification Search
CPC .............. G06F 16/313; G06F 16/3329; G06K 9/00221; G06K 9/00442; G06N 20/00; G06Q 50/26; G10L 15/26; H04W 4/02
See application file for complete search history.

(56) References Cited

U.S. PATENT DOCUMENTS 9,619,851 B1 * 4/2017 McIntyre ............... G06Q 50/26
2002/0116247 A1 8/2002 Tucker et al.
(Continued)

OTHER PUBLICATIONS

"bSafe—Personal Safety App," Mobile Software AS, Android Apps on Google Play, accessed Jan. 24, 2018, 3 pages. https://play.google.com/store/apps/details?id=com.bipper.app.bsafe&hl=en.

*Primary Examiner* — Diedra McQuitery
(74) *Attorney, Agent, or Firm* — Yee & Associates, P.C.

(57) ABSTRACT

A method, system, and computer program product for managing evidence. An evidence management system comprises a computer system that stores information about an incident in evidence records for a witness zones. The evidence records are associated with witness zones for storing evidence for the incident. The witness zones are areas from which the evidence is collected. The computer system collects the evidence for the incident from client devices in the witness zones based on the evidence records. The computer system analyzes the evidence collected for the incident in the evidence records based on the witness zones from which the evidence was collected, enabling the computer system to reduce an amount of time to collect the evidence for the incident.

19 Claims, 10 Drawing Sheets

(51) Int. Cl.
*G10L 15/26* (2006.01)
*G06N 20/00* (2019.01)

(56) References Cited

U.S. PATENT DOCUMENTS

| | | |
|---|---|---|
| 2006/0269104 A1 | 11/2006 | Ciolli |
| 2009/0210245 A1 | 8/2009 | Wold |
| 2013/0150074 A1* | 6/2013 | Shrestha ............. G06Q 50/265 |
| | | 455/456.1 |
| 2013/0165157 A1* | 6/2013 | Mapes ................. H04W 4/029 |
| | | 455/456.5 |
| 2015/0161877 A1 | 6/2015 | Hamalainen et al. |
| 2015/0223040 A1 | 8/2015 | Pahlevani |
| 2015/0327039 A1 | 11/2015 | Jain |
| 2015/0381942 A1* | 12/2015 | Brewer ................... H04L 67/22 |
| | | 348/143 |
| 2016/0140446 A1 | 5/2016 | Adderly et al. |
| 2017/0076394 A1* | 3/2017 | Manweiler ............. G06Q 40/08 |
| 2017/0144758 A1* | 5/2017 | Myslinski ............. B64C 39/024 |
| 2018/0227959 A1* | 8/2018 | Fraccaroli ............. H04W 76/14 |
| 2019/0043351 A1* | 2/2019 | Yang ................... G06F 21/6245 |

\* cited by examiner

EVIDENCE MANAGEMENT SYSTEM AND METHOD

BACKGROUND

1. Field

The disclosure relates generally to an improved computer system and more specifically to a method, an apparatus, a system, and a computer program product for collecting and processing evidence.

2. Description of the Related Art

The criminal justice system is heavily dependent on evidence. The evidence can include photos, videos, audio recordings, documents, witnesses, or other types of evidence. The criminal justice system relies heavily on evidence provided by eye witnesses. Eye witness evidence is based on a person recalling what the person saw or experienced. This type of evidence is typically provided verbally or in written form.

Depending on the amount of time that elapsed between the incident and the witness statement being given by the witness, the quality of the information may be less reliable. Memory is a reconstructive process that is susceptible to distortion. Memories become weaker and more susceptible to distortion over time. Further, memory distortion increases as people age. Thus, the age of the witness can be a factor in how fast a memory becomes distorted over time. Further, the information provided by the witness may be influenced by what the witness has heard from people, read or seen on social media, or from other sources since the occurrence of the incident.

The quality and amount of evidence presented can be a huge factor in the outcome of a criminal case. An incorrect outcome has costs on both sides. The cost can be financial or it could be emotional.

Today, identifying witnesses, collecting evidence, documenting evidence, processing evidence, and analyzing evidence is a very labor intensive and time-consuming set of tasks. In many cases, enforcement personnel are not present at the crime scene at the time of the incident. Usually, law enforcement personnel travel to a crime scene after the crime has occurred.

While at the scene, law enforcement personnel interview people at or near the crime scene in hopes of identifying witnesses. The law enforcement personnel are able to obtain witness statements only after the witnesses have been identified. Law enforcement personnel typically make notes on notepads or record notes on recording devices. At a later time, after visiting the crime scene, the law enforcement personnel enter a written report. Further, the law enforcement personnel may enter brief notes in the in-vehicle systems that may be used as documented evidence at a later time.

Witnesses may be questioned at the crime scene, home, work, the police station, or other locations. In a location other than at the crime scene, evidence is documented at a time after the incident. Additionally, obtaining high quality pictures, written content, audio, and video from witnesses helps improve the quality of the evidence. Identifying the witnesses, however, can be a challenge.

For example, by the time the law enforcement personnel arrive at the scene of an incident, key eye witnesses may have left, and identifying and locating them can be quite challenging, time-consuming, and costly. Another challenge that law enforcement face is that the witnesses are at times reluctant in making direct contact with the law enforcement personnel to provide evidence due to being in fear of retaliation from the criminal or to avoid inconvenience of interviews and testifying at trial.

Therefore, it would be desirable to have a method and apparatus that take into account at least some of the issues discussed above, as well as other possible issues. For example, it would be desirable to have a method and apparatus that overcome a technical problem with identifying and obtaining evidence from witnesses to an incident.

SUMMARY

The embodiments of the present disclosure provide an evidence management system comprising a computer system that stores information about an incident in a group of evidence records for a group of witness zones, wherein the group of evidence records are associated with the group of witness zones for storing evidence for the incident, and wherein the group of witness zones are areas from which the evidence is collected. The computer system collects the evidence for the incident from client devices in the group of witness zones based on the group of evidence records. The computer system analyzes the evidence collected for the incident in the group of evidence records based on the group of witness zones from which the evidence was collected, enabling the computer system to reduce an amount of time to collect the evidence for the incident.

In one embodiment, the evidence management system comprises a computer system that collects information for an incident from client devices in a group of witness zones identified for the incident. Also, the computer system stores evidence collected for the incident from the client devices in a group of evidence records corresponding to the witness zones from which the evidence was collected. Further, the computer system creates a new evidence record when a new witness zone not covered by an existing evidence record in the group of evidence records is identified in which the new evidence record is for the evidence collected for the incident from the new witness zone, enabling the computer system to collect more relevant evidence for the incident.

In another embodiment, a method for managing evidence comprises creating, by a computer system, a group of evidence records for a group of witness zones, wherein an evidence record identifies a witness zone for evidence. Further, the method comprises collecting, by the computer system, the evidence from client devices for the incident based on the group of evidence records. Even further, the method comprises storing, by the computer system, the evidence collected in the group of evidence records. Further, the method comprises analyzing, by the computer system, the evidence collected for the incident in the group of evidence records based on the group of witness zones from which the evidence was collected, enabling the computer system to increase an amount of the evidence collected for the incident.

In yet another embodiment, a computer program product for managing evidence comprises a computer-readable storage media; first program code, stored on the computer-readable storage media, for creating a group of evidence records for a group of witness zones, wherein an evidence record identifies a witness zone for the evidence; second program code, stored on the computer-readable storage media, for collecting the evidence from client devices for the incident based on the group of evidence records; third program code, stored on the computer-readable storage media, for storing the evidence collected in the group of evidence records; and fourth program code, stored on the computer-readable storage media, for analyzing the evidence collected for incident in the group of evidence records based on the group of witness zones from which the evidence was collected, enabling the computer system to increase an amount of the evidence collected for the incident.

DETAILED DESCRIPTION

Figure 1:
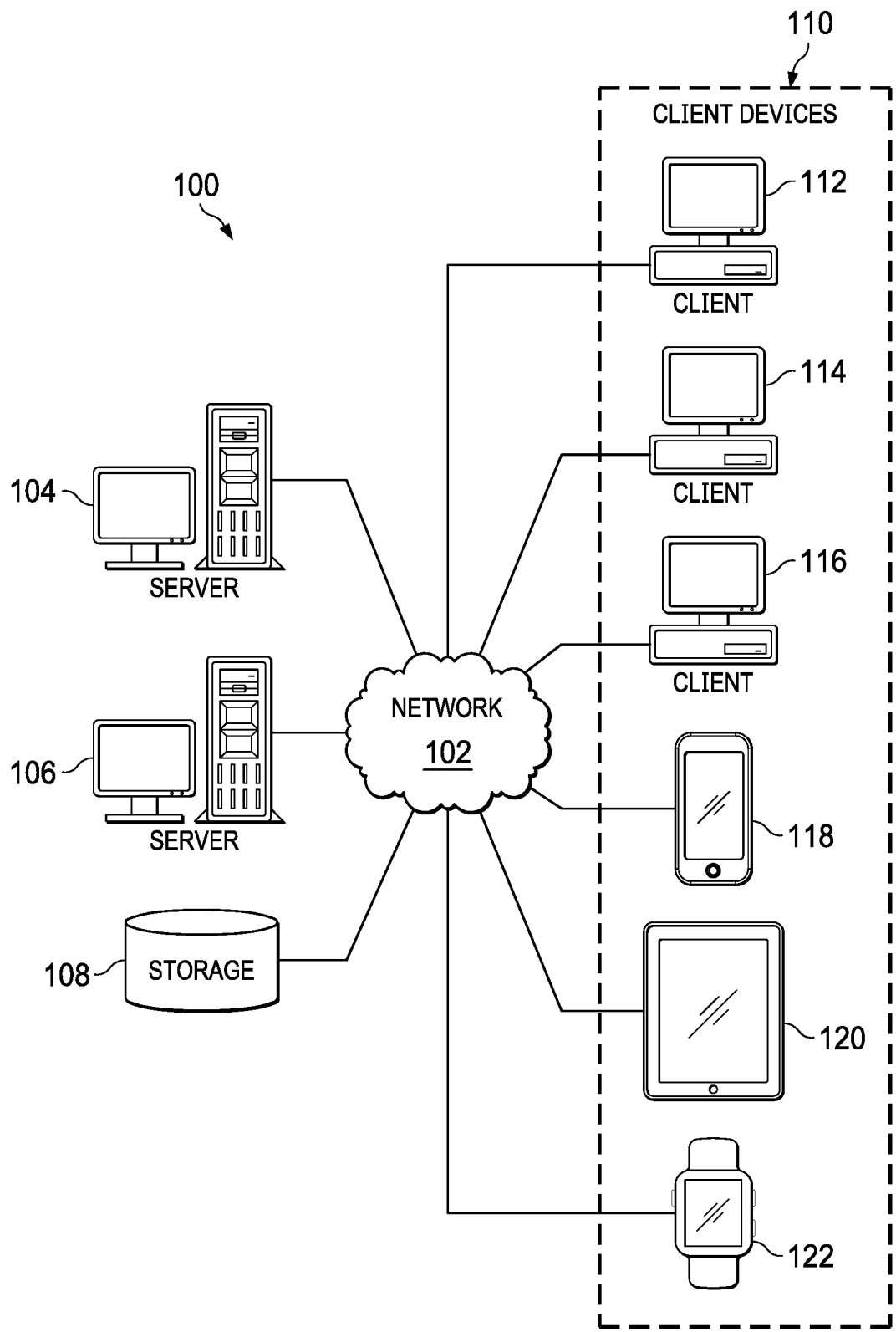
FIG. 1 is a pictorial representation of a network of data processing systems in which illustrative embodiments may be implemented.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to customize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures and, in particular, with reference to FIG. 1, a pictorial representation of a network of data processing systems in which illustrative embodiments may be implemented is depicted. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart watch 122.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan network (MAN), or a wide area network (WAN). FIG. 1 is intended as an example, and not as an architectural limitation for the different illustrative embodiments.

As used herein, when used with reference to items, "a number of," when used with reference items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
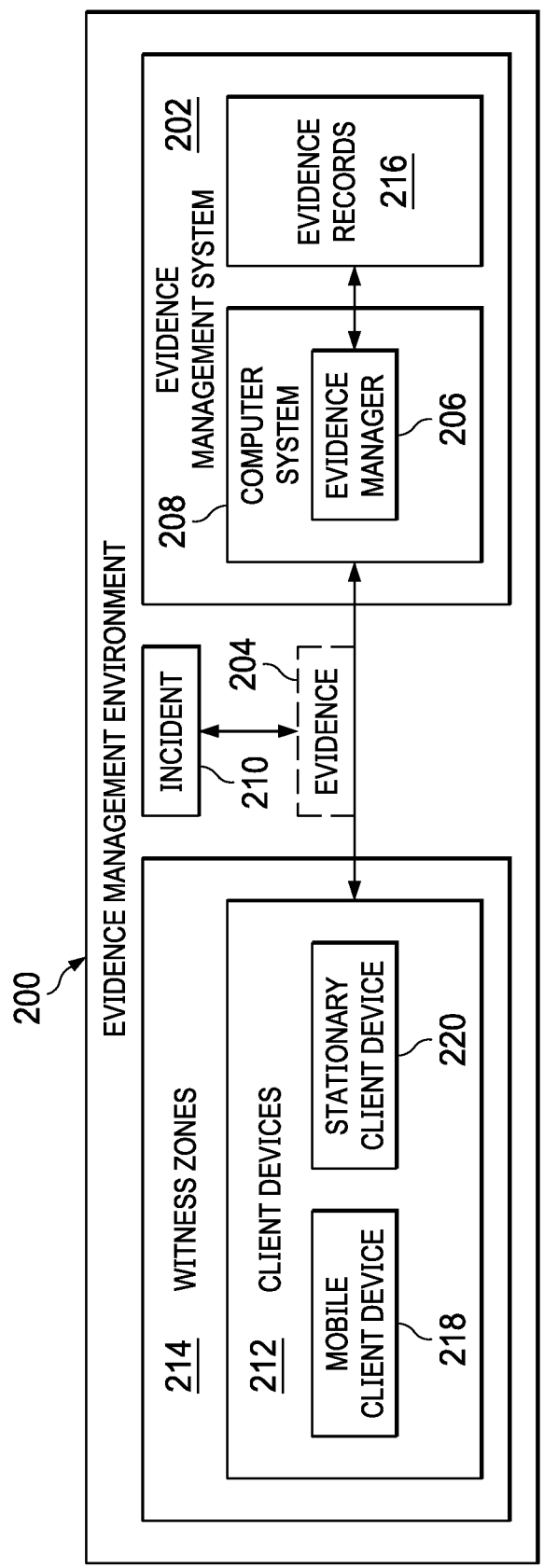
FIG. 2 is a block diagram of an evidence management environment in accordance with an illustrative embodiment.

With reference now to FIG. 2, a block diagram of an evidence management environment is depicted in accordance with an illustrative embodiment. In this illustrative example, evidence management environment 200 illustrates components that can be implemented in hardware such as the hardware shown in network data processing system 100 in FIG. 1.

In this illustrative example, evidence management system 202 in evidence management environment 200 operates to manage evidence 204. As depicted, evidence 204 is identified and collected by evidence management system 202. For example, evidence management system 202 also can store evidence 204.

As depicted, evidence management system 202 comprises evidence manager 206 and computer system 208. Evidence manager 206 runs on computer system 208. Computer system 208 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system. For example, computer system 208 can comprise one or more data processing systems within network data processing system 100 in FIG. 1.

In this illustrative example, evidence manager 206 can be implemented in software, hardware, firmware, or a combination thereof. When software is used, the operations performed by evidence manager 206 may be implemented in program code configured to run on hardware, such as a processor unit. When firmware is used, the operations performed by evidence manager 206 can be implemented in program code and data and stored in persistent memory to run on a processor unit. When hardware is employed, the hardware may include circuits that operate to perform the operations in evidence manager 206.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As depicted, evidence manager 206 collects evidence 204 for incident 210 from client devices 212 in a group of witness zones 214 identified for incident 210. As used herein, "a group of," when used with reference to items, means one or more items. For example, "a group of witness zones 214" is one or more of witness zones 214.

In this illustrative example, client devices 212 can include at least one of mobile client device 218 or stationary client device 220. Mobile client device 218 can be the device that is handheld or carried by a person. Mobile client device 218 can be, for example, a mobile phone, a smart watch, a digital camera, a tablet computer, or some other type of mobile client device. Stationary client device 220 can take a number different forms. For example, stationary client device 220 can be a computer connected to one or more surveillance cameras for an automatic teller machine, a building, or some other structure. In another illustrative example, stationary client device 220 can be a traffic management system in a city in which a computer system has traffic cameras located at various intersections and roadways. Further, the cameras can include microphones or the microphones may also be separately connected to the computer system.

Evidence manager 206 stores evidence 204 collected for incident 210 from client devices 212 in a group of evidence records 216 corresponding to the group of witness zones 214 from which evidence 204 was collected. Evidence records 216 are electronic records that can be stored in a storage unit such as storage unit 108 in FIG. 1. The storage unit can take various forms. For example, the storage unit may be a disk drive, a cloud storage, an optical drive system, a network attached storage (NAS), or some other suitable type of storage unit.

In this illustrative example, evidence manager 206 processes evidence 204 for analysis. For example, evidence manager 206 can perform at least one of keyword identification, audio-to-text conversion, optical character recognition, visual recognition, facial recognition, entity identification, object recognition, location identification, or perform other suitable types of processing. Evidence manager 206 analyzes evidence 204 collected for incident 210 in the group of evidence records 216 based on the group of witness zones 214 from which evidence 204 was collected, enabling computer system 208 to increase an amount of evidence 204 collected for incident 210.

Figure 3:
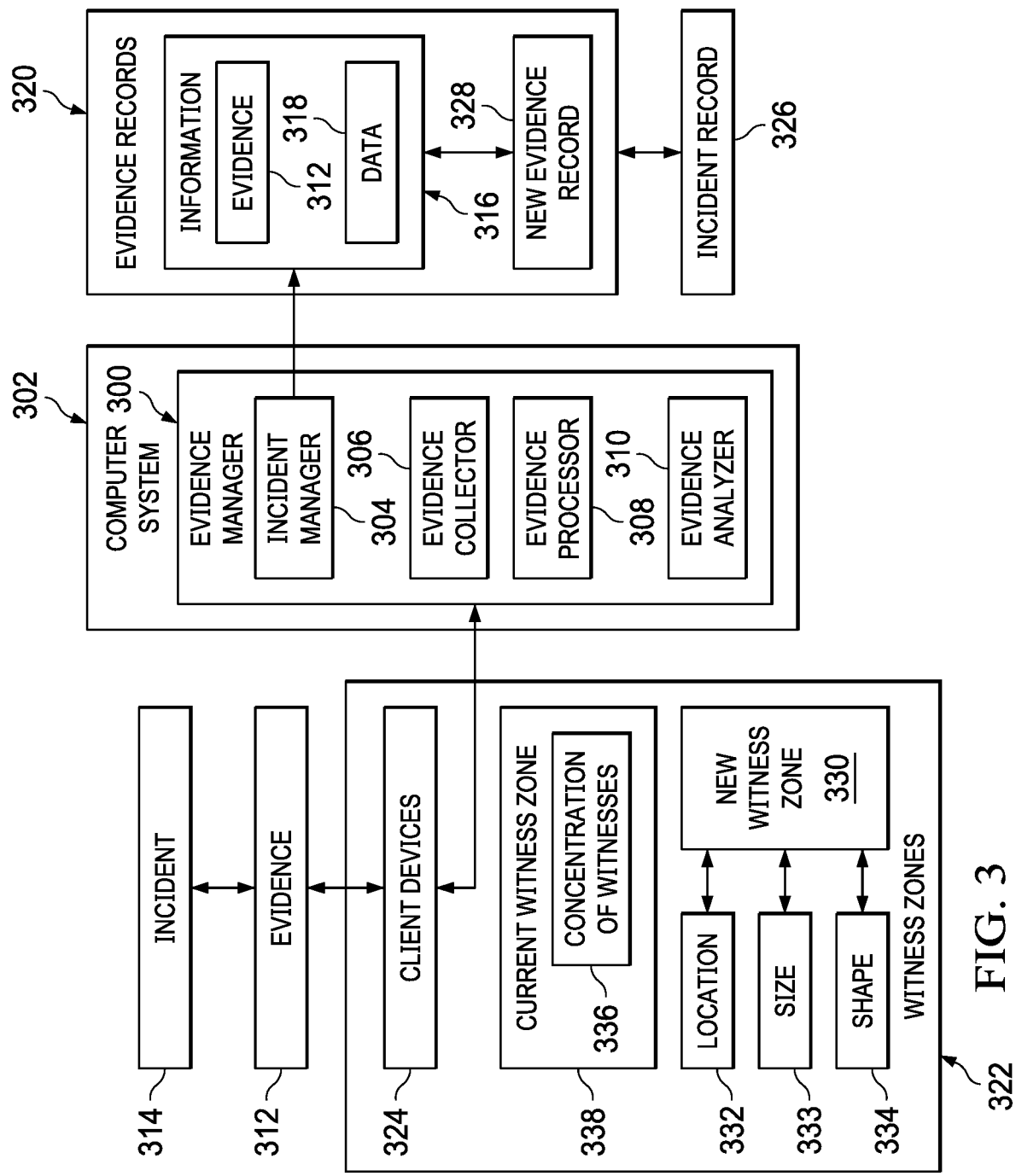
FIG. 3 is a block diagram of an evidence manager in accordance with an illustrative embodiment.

With reference next to FIG. 3, a block diagram of an evidence manager is depicted in accordance with an illustrative embodiment. In this illustrative example, evidence manager 300 is an example of one implementation for evidence manager 206 in FIG. 2. As depicted, evidence manager 300 runs on computer system 302 and includes a number of different components. In this illustrative example, evidence manager 300 includes incident manager 304, evidence collector 306, evidence processor 308, and evidence analyzer 310. These components are used to manage evidence 312 about incident 314. In this example, incident 314 is a crime. For example, incident 314 may be at least one of an assault, a robbery, an extortion, racketeering, vandalism, a burglary, theft, or some other crime. As depicted, these components enable computer system 302 to increase at least one of an amount or quality of evidence 312 collected for incident 314. Additionally, these components also can increase efficiency in electing evidence 312 which can result in reducing the amount of time needed to collect evidence 312 as compared to currently used techniques.

In this illustrative example, incident manager 304 stores information 316 about incident 314. As depicted, information 316 includes evidence 312 and also can include data 318. In this illustrative example, data 318 can describe evidence 312, provide opinions about evidence 312, provide confidence levels for evidence 312, or provide other types of information relevant to evidence 312.

In this illustrative example, incident manager 304 manages evidence 312 for incident 314. For example, incident manager 304 stores information 316 in a group of evidence records 320. The group of evidence records 320 corresponds to a group of witness zones 322. The group of witness zones 322 is a group of geographic areas from which evidence 312 is collected. Each evidence record in evidence records 320 is associated with a witness zone in the group of witness zones 322. The group of evidence records 320 is associated with the group of witness zones 322 for storing evidence 312 for incident 314. As depicted, incident manager 304 stores evidence 312 in evidence records 320 that correspond to witness zones 322 from which evidence 312 is collected.

The collection of evidence 312 for incident 314 can be initiated through incident manager 304 in these illustrative examples. For example, incident manager 304 creates incident record 326 for incident 314. The group of evidence records 320 is associated with incident record 326. As depicted, incident record 326 includes a date, a time, a location, and a description of incident 314. Incident record 326 may also include other initial information about incident 314. For example, suspect photos may be placed in incident record 326. These photos may or may not be evidence 312 obtained from incident 314. For example, the photos may be mugshots or photos taken at another time prior to incident 314.

In this illustrative example, evidence collector 306 collects evidence 312 for incident 314 from client devices 324 in the group of witness zones 322 based on the group of evidence records 320. In other words, evidence collector 306 collects evidence 312 from client devices 324 located in the group of witness zones 322. Client devices 324 may have been located in the group of witness zones 322 during incident 314, at a time prior to incident 314, or after incident 314.

For example, evidence 312 can be collected at a time prior to incident 314 in a witness zone. Evidence 312 can be collected for at least one of a person of interest, a vehicle of interest, or some other suitable item. For example, video or photos of a suspect may be obtained from cameras from where a suspect traveled to reach the location of incident 314. Evidence 312 can be collected during or after incident 314 and be used to identify where potential persons of interest, a vehicle of interest, or other items may have traveled to after incident 210.

In this illustrative example, evidence collector 306 processes evidence records 320 to collect evidence 312. Each of evidence records 320 is associated with a witness zone in the group of witness zones 322. Evidence 312 for incident 314 collected by evidence collector 306 is stored in one or more of the group of evidence records 320 for incident 314.

In this illustrative example, evidence processor 308 processes evidence 312 collected by evidence collector 306 for an analysis by evidence analyzer 310. In other words, evidence processor 308 can format and extract data from evidence 312 for use by evidence analyzer 310. For example, evidence collector 306 performs at least one of keyword identification, audio-to-text conversion, optical character recognition, visual recognition, facial recognition, entity identification, object recognition, location identification, or perform other suitable processing of evidence 312. In this example, this data can be used by evidence analyzer 310 to analyze and interpret evidence 312. This data can be considered part of information 316 stored in evidence records 320 for processing by evidence processor 308.

In this illustrative example, audio can be processed by evidence processor 308 to identify types of sounds. In one example, images containing documents or signs may be processed to extract text. Based on identifying text, keywords for analysis by evidence analyzer 310 can be identified. Audio content also can be converted into text for identification of keywords. For example, a sound of a barking dog may indicate the presence of a person such as a suspect within the witness zone from which evidence 312 was collected. The results of processing evidence 312 are part of information 316 and can be stored with evidence 312 in evidence records 320.

As depicted, evidence analyzer 310 analyzes evidence 312 collected for incident 314 in the group of evidence records 320 based on the group of witness zones 322 from which evidence 312 was collected. In analyzing evidence 312 collected from the group of witness zones 322, evidence processor 308 performs at least one of identifying a confidence level for a piece of evidence 312, or identifying common keywords between pieces of evidence 312.

Further, the analysis of evidence 312 can result in identifying new potential leads for identifying witnesses. For example, evidence analyzer 310 creates new evidence record 328 when new witness zone 330 that is not covered by an existing evidence record in the group of evidence records 320 is identified from analyzing evidence 204. The creation of new evidence record 328 results in evidence collector 306 collecting evidence 312 for incident 314 from new witness zone 330. Evidence collector 306 can detect the presence of new evidence record 328 causing evidence collector 306 to initiate evidence 312 from new witness zone 330. Alternatively, an evidence request can be sent to evidence collector 306 indicating that new evidence record 328 is present for use in collecting evidence 312.

In this example, evidence analyzer 310 identifies new witness zone 330 for the group of witness zones 322 by selecting location 332 for new witness zone 330 that overlaps at least one witness zone in the group of witness zones 322 when concentration of witnesses 336 in current witness zone 338 in the group of witness zones 322 exceeds a threshold. As depicted, evidence analyzer 310 selects at least one of location 332, size 333, or shape 334 for new witness zone 330 based on at least one of reducing an amount of overlap between new witness zone 330 and the group of witness zones 322, based on a direction of travel of a person of interest, or based on some other suitable factor.

As depicted, evidence analyzer 310 comprises at least one of an artificial intelligence system, a question answering system, a Bayesian network, a neural network, a machine-learning system, or some other suitable type of machine-learning or artificial intelligence system. For example, evidence analyzer 310 can be implemented using IBM Watson, which is a cognitive system available from International Business Machines Corporation. IBM Watson was created as a question answering (QA) computing system built to apply advanced natural language processing, information retrieval, knowledge representation, automated reasoning, and machine-learning technologies to the field of open domain question answering.

Thus, evidence manager 300 can be used to increase at least one of the speed, efficiency, or accuracy of decisions made by law enforcement personnel when incident 314 takes the form of a crime. With evidence manager 300, the identification, collection, and processing of evidence 312 can be performed more efficiently as compared to currently used techniques by law enforcement officials. With evidence records 320, law enforcement officials improve investigating and decision-making with respect to investigating crimes.

Figure 4:
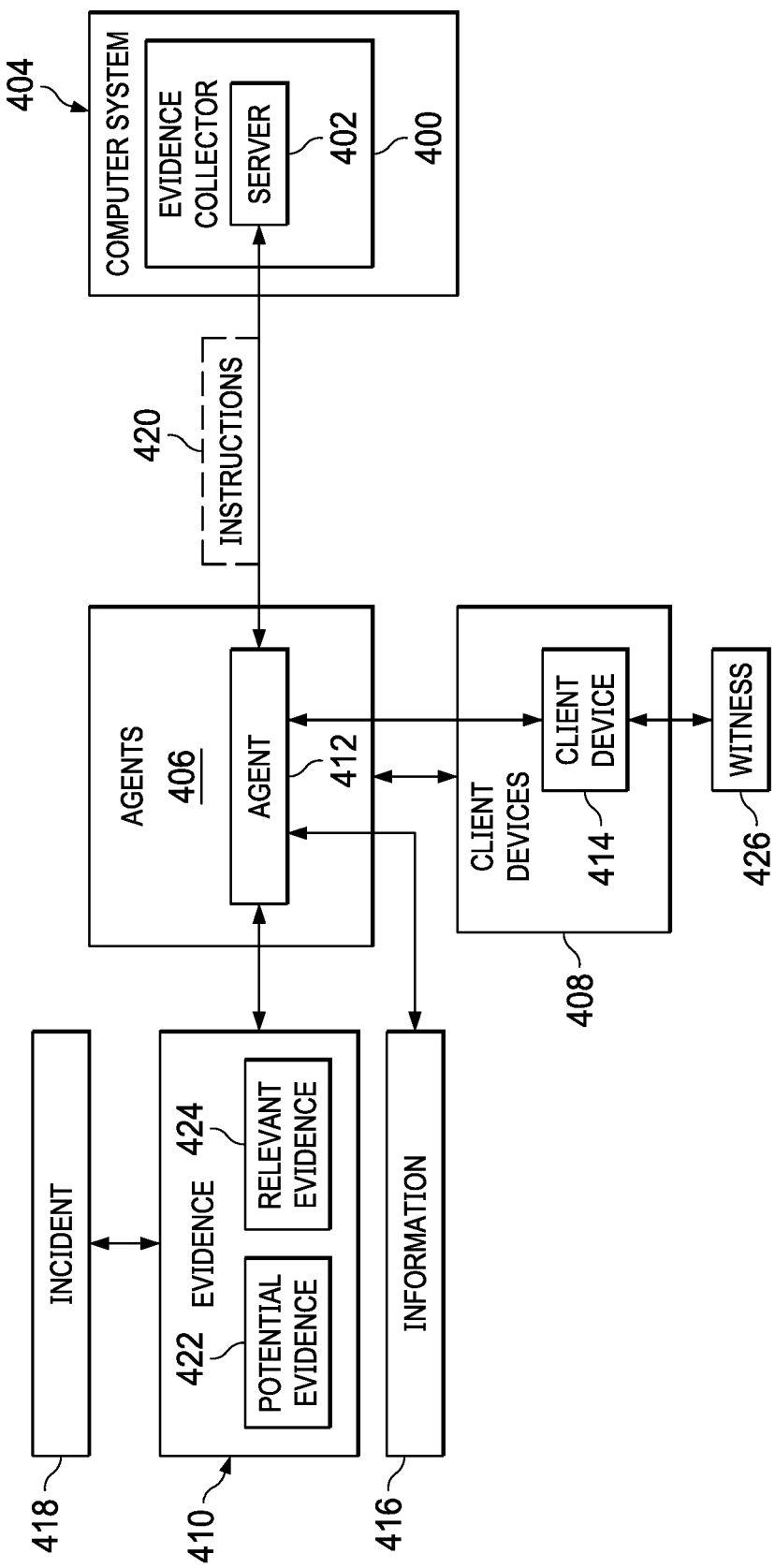
FIG. 4 is a dataflow for an evidence collector in accordance with an illustrative embodiment.

With reference next to FIG. 4, a dataflow for an evidence collector is depicted in accordance with an illustrative embodiment. In this example, evidence collector 400 is an example of an implementation for evidence collector 306 in FIG. 3. In this example, evidence collector 400 comprises server 402 running on computer system 404.

Server 402 communicates with agents 406 running on client devices 408 to collect evidence 410 from client devices 408. Agent 412 in agents 406 on a client device 414 in client devices 408 can collect evidence 410 in real-time during the occurrence of incident 418 or after the occurrence of incident 418. When incident 418 takes the form of a crime, client device 414 is carried or owned by witness 426. The collection of evidence 410 from client device 414 is made with permission from witness 426 in these illustrative examples.

As depicted, agent 412 can capture evidence 410 selected from at least one of text, photographs, video, audio, voice recordings, or other suitable types of evidence 410 for incident 418. Further, agent 412 records information 416 about evidence 410 selected from at least one of a time stamp or a location of client device 414. The location is a geographic location and can include latitude, longitude, attitude, and relative movement or direction of client device 414 in relation to the location of incident 418.

Further, agent 412 can also record the location of information 416 about witness 426. In this illustrative example, witness 426 is a person who carries or owns client device 414. In this manner, the location of witness 426 can be identified over different periods of time. Additionally, agent 412 can also generate a request to witness 426 to obtain permission to collect evidence 410 from client device 414. Further, agent 412 can be instructed through server 402 to request witness 426 to create evidence 410. The creation of evidence 410 by witness 426 may include taking photos, video, entering voice memos, or other types of evidence 410.

As depicted, agent 412 identifies evidence 410 for incident 418 based on instructions 420 received from server 402, enabling reducing resources used on computer system 404 to process evidence 410 for incident 418. As depicted, instructions 420 comprise logic in program code and data needed to identify the desired evidence. Instructions 420 can be used to pre-process potential evidence 422 to determine what portions of potential evidence 422 are sufficiently relevant to incident 418 to send to server 402 as evidence 410.

For example, agent 412 can pre-process potential evidence 422 and identify what portions of potential evidence 422 are relevant evidence 424 in evidence 410. This pre-processing identifies relevant evidence 424 from potential evidence 422 in evidence 410. For example, the identification can be made using evidence 410 already known and shared by an evidence analyzer.

The priority to send potential evidence 422 to server 402 is lower than relevant evidence 424. For example, potential evidence 422 may still be sent when high speed connectivity is available to client device 414. Thus, potential evidence 422 is eventually sent to server 402 because potential evidence 422 may become relevant evidence 424 as more information is collected and processed, or more rigorous analysis is conducted by the evidence analyzer. Additionally, if potential evidence 422 is validated as relevant evidence 424, then relevant evidence 424 is sent to the evidence analyzer for inclusion with all other evidence collected. Evidence 410 collected from client devices 408 comprises at least one of text, a document, a photo, a video, an audio recording, a text message, an email message, a global positioning system, information, a scent, atmospheric pressure, temperature, humidity, or other evidence that can be stored in client devices 408.

Thus, based on priority, the raw data in potential evidence 422 can be ultimately sent to server 402 for processing by an evidence processor and an evidence analyzer in some illustrative examples. In another illustrative example, agent 412 may send potential evidence 422 for processing by server 402 to determine which of evidence 410 is relevant to incident 418 and should be stored in an evidence record.

By having agent 412 on client device 414 pre-processing evidence 410, a number of different technical effects are present. For example, evidence 410 can be identified more quickly as compared to currently available techniques or as compared to having server 402 or some other component in computer system 404 pre-processing evidence 410 to identify relevant evidence 424 from potential evidence 422.

As depicted, using agents 406 and client devices 408 provides for distributed pre-processing to offload these tasks from computer system 404, thus enabling a reduction in the amount of resources used in computer system 404. Further, the use of agent 412 and client device 414 pre-processing evidence 410 can result in prioritizing the transmission of evidence 410 to server 402. In this manner, a technical effect of providing a more efficient use of communication resources occurs. For example, by identifying potential evidence 422 and relevant evidence 424 in evidence 410, the amount of data transferred by client devices 408 is reduced when only relevant evidence 424 is transferred to server 402. Further, by identifying relevant evidence 424, the amount of noise and data transfer also can be reduced.

In the illustrative examples, one or more technical solutions are present that overcome a technical problem with identifying and obtaining evidence from witnesses to an incident. As a result, one or more technical solutions may provide a technical effect of collecting evidence necessary to analyze an incident such as a crime. One or more technical solutions can provide an automated mechanism for identifying witnesses and collecting evidence an incident such as a crime. This automated mechanism can be implemented in evidence manager 206 in FIG. 2 or evidence manager 300 in FIG. 3. The evidence manager in the illustrative examples can identify witnesses and evidence that is related to an incident. In the illustrative example, the collection of evidence can be made in a systematic and unbiased fashion. Further, this evidence can be collected more quickly, which reduces issues associated with the memory of human witnesses fading or becoming distorted.

As a result, the computer systems in the illustrative examples operate as special purpose computer systems in which an evidence manager enables a more efficient collection of evidence for an incident. In particular, an evidence manager, such as evidence manager 206 or evidence manager 300, transforms computer system, such as computer system 208 or computer system 302, into special purpose computer systems as compared to currently available general computer systems that do not have an evidence manager.

The illustration of evidence management environment 200, evidence manager 206, evidence manager 300, and other components depicted in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, an incident has been described as being a crime. An incident can take other forms in addition to or in place of a crime. For example, an incident can be selected from a group comprising a crime, a civil wrong, an automobile accident, a tort, a breach of contract, a breach of trust, a play for a sporting event, a portion of a sporting event, and a fraud investigation. In still another illustrative example, more than one evidence manager may operate in evidence management environment 200 to collect evidence for the same or different incidents. In yet another illustrative example, agents 406 can be part of evidence collector 400 instead of being separate functional components as illustrated in FIG. 4.

In still another illustrative example, other components in an evidence manager in addition to or in place of an evidence analyzer can be implemented using artificial intelligence systems. For example, at least one of incident manager 304, evidence collector 306, or evidence processor 308 can be implemented using one or more types of artificial intelligence systems in addition to evidence analyzer 310 in FIG. 3.

Figure 5:
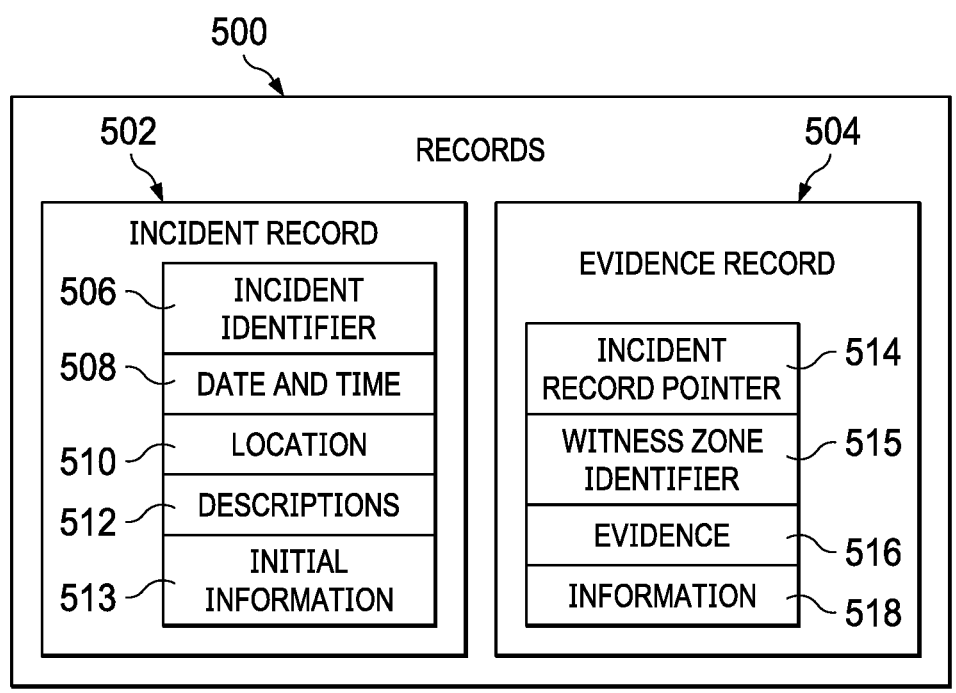
FIG. 5 a block diagram of records used by an evidence manager in accordance with an illustrative embodiment.

Turning to FIG. 5, a block diagram of records used by an evidence manager is depicted in accordance with an illustrative embodiment. Records 500 are examples of records that can be used by evidence manager 206 in FIG. 2 and evidence manager 300 in FIG. 3. As depicted, records 500 include incident record 502 and evidence record 504.

In this example, incident record 502 includes a number of different pieces of information. As depicted, incident record 502 includes incident identifier 506, date and time 508, location 510, description 512, and initial information 513.

Incident identifier 506 is an identifier for the incident. This identifier may be alpha numeric, a name, or some other suitable type identifier. Date and time 508 indicates the date and time of the incident. Location 510 identifies the location where the incident occurred or is occurring. This location may include latitude, longitude, and altitude.

Description 512 is a description of the incident. This description may be, for example, a single word identifying the incident, a sentence, a paragraph summarizing the incident, or some other suitable form. Initial information 513 may include any information about the incident. For example, a mugshot of the suspect, a vehicle identification, or other information may be included in initial information 513.

As depicted, evidence record 504 includes incident record pointer 514, witness zone identifier 515, evidence 516, and information 518. Incident record pointer 514 points to the incident record for which evidence record 504 has been created. Witness zone identifier 515 identifies the witness zone associated with evidence record 504. This identification may be a unique identifier, the location of the witness zone, or some other suitable identifier.

Evidence 516 is evidence collected from the witness zone. Evidence 516 can be the actual evidence such as photos, documents, audio recording, or other types of evidence. In another illustrative example, evidence 516 can be pointers to where the evidence is stored.

Information 518 is information derived from evidence 516. For example, information 518 can be text generated from audio-to-text conversion, optical character recognition, or some other source. As another example, information 518 can be an identification of an object, a photo, a drawing, or some other document.

The illustration of records 500 is limited as an example of one manner in which records are implemented for use and not as a limitation to the manner in which records may be implemented in other illustrative examples. For example, initial information 513 can be omitted from incident record 502 in other illustrative examples. As another example, information 518 can include information generated by evidence analyzer. For example, information 518 can include confidence levels, conclusions, or other results generated by evidence analyzer analyzing evidence 516.

Figure 6:
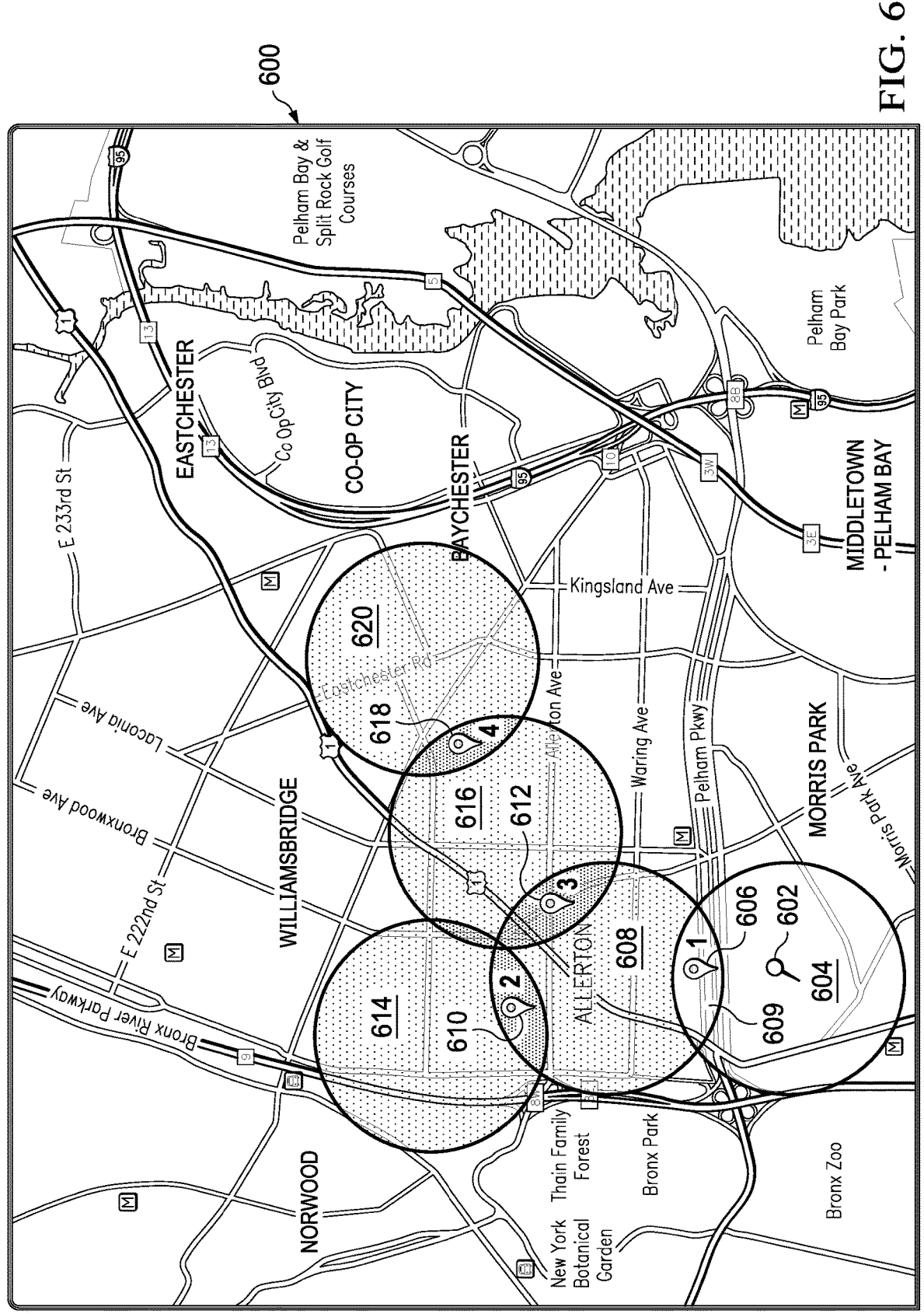
FIG. 6 is an illustration of witness identification using witness zones in accordance with an illustrative embodiment.

With reference next to FIG. 6, an illustration of witness identification using witness zones is depicted in accordance with an illustrative embodiment. As depicted, map 600 illustrates witness zones from which evidence can be collected for an incident. As depicted, point 602 is the location of the incident for which evidence is collected. In this example, witness zone 604 is the initial witness zone. This witness zone is a circle with the location at point 602 being the center of witness zone 604. As depicted, evidence is gathered from any client devices within witness zone 604. The evidence gathered from these client devices are used to identify witnesses for the incident.

These witnesses may have evidence relevant to the incident. If a sufficient number of witnesses are present in a particular location within witness zone 604, a new witness zone may be created to extend the collection of evidence beyond witness zone 604. As depicted, location 606 is identified as a location having a concentration of witnesses greater than the threshold. In this example, location 606 can be the location of a cluster of witnesses having a concentration exceeding the threshold. A new evidence record is created for a new witness zone, witness zone 608. As depicted, the placement of witness zone 608 is performed to reduce the overlap between witness zone 608 and witness zone 604.

The evidence record is used to store evidence collected from witness zone 608. The evidence stored is evidence that does not duplicate evidence collected in overlap 609 between witness zone 604 and witness zone 608.

As depicted, concentrations of witnesses greater than a threshold are identified as location 610 and location 612 within witness zone 608. Each of these locations represents the cluster witnesses having a concentration greater than the threshold. As a result, new witness zones are created. In this example, witness zone 614 and witness zone 616. Evidence records are also created to store evidence collected from these witnesses.

In this illustrative example, location 618 is a location within witness zone 616 in which the concentration of witnesses is greater than the threshold. As a result, a new witness zone, witness zone 620, is created along with an evidence record or the evidence collected from witness zone 620.

Figure 7:
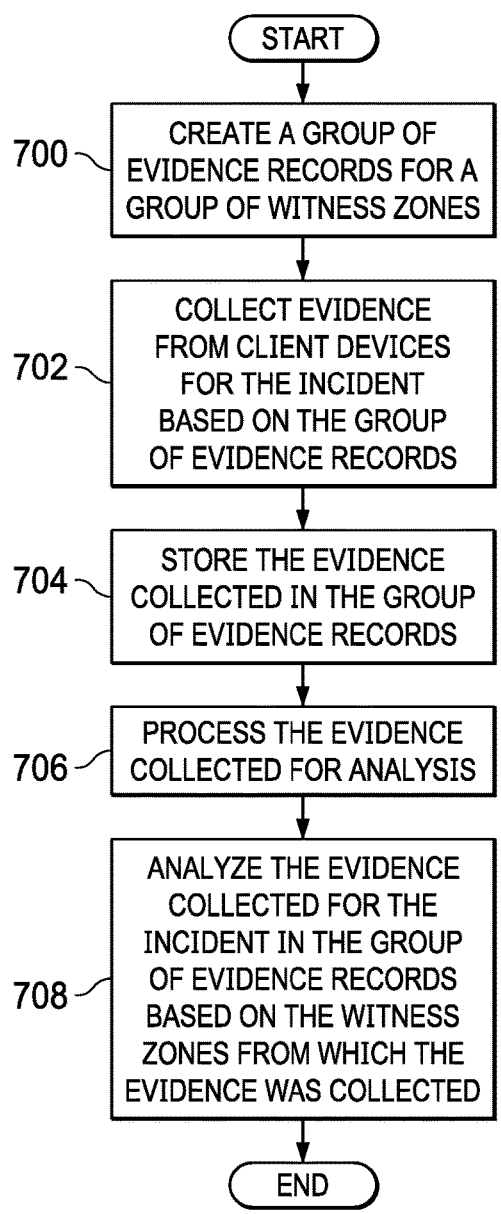
FIG. 7 is a flowchart of a process for managing evidence for an incident in accordance with an illustrative embodiment.

Turning next to FIG. 7, a flowchart of a process for managing evidence for an incident is depicted in accordance with an illustrative embodiment. The process illustrated in FIG. 7 can be implemented in evidence manager 206 in FIG. 2 or evidence manager 300 in FIG. 3. The different steps in this process can be implemented using at least one of hardware or software. When software is used, these steps can be implemented in instructions taking the form of program code that can be run on a processor unit for a server computer, a client device, a computer system, or some other data processing system.

The process begins by creating a group of evidence records for a group of witness zones (step 700). The evidence record is associated with a witness zone for evidence of the incident. In this example, the witness zone can be identified from the evidence record through information in the evidence record, using a table for corresponding evidence records to witness zones, or some other manner. The process collects evidence from client devices for the incident based on the group of evidence records (step 702). The process stores the evidence collected in the group of evidence records (step 704).

The evidence collected is processed for analysis (step 706). This processing of evidence places the evidence in a form for analysis by an evidence analyzer. In this illustrative example, step 706 can be performed using at least one of keyword identification, audio-to-text conversion, optical character recognition, visual recognition, facial recognition, entity identification, object recognition, location identification, or some other type of processing of the evidence collected from the witness zones. Additional, for example, audio analysis and voice recognition can be performed to identify sources of sales in an environment. For example, audio analysis may be performed to identify barking dogs in the environment. The processing of this result can be used to indicate that a person of interest may have passed by the location resulting in the barking dog being present in the audio. Further, audio and video can be analyzed to identify actions, such as running, walking, jumping, or other actions.

The process analyzes the evidence collected for the incident in the group of evidence records based on the witness zones from which the evidence was collected (step 708). The process terminates thereafter.

These steps in the flowchart in FIG. 7 enable the computer system to increase an amount of the evidence collected for the incident. In one illustrative example, the analysis can result in creating a new evidence record. The new evidence record can be created when a new witness zone is identified that is not covered by an existing evidence record in the group of evidence records, enabling the computer system to collect more relevant evidence for the incident.

Figure 8:
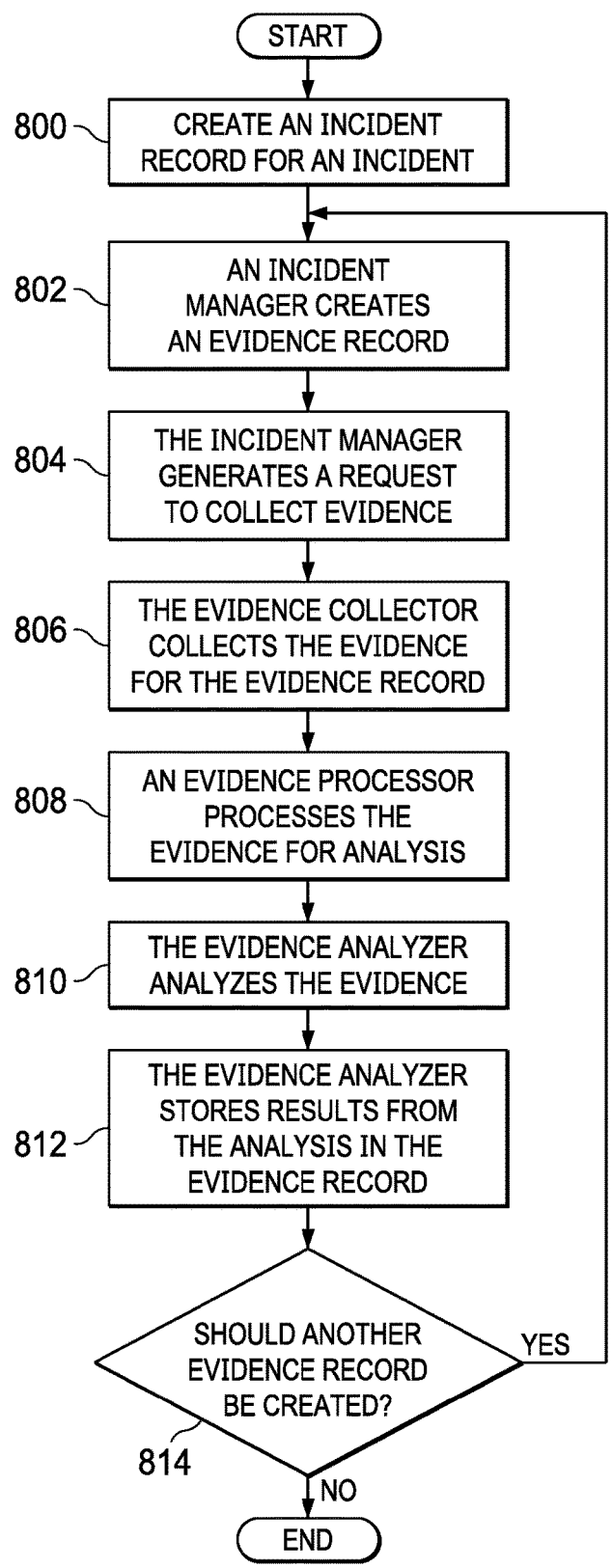
FIG. 8 is a flowchart of a process for collecting evidence for an incident depicted in accordance with an illustrative embodiment.

Turning next to FIG. 8, a flowchart of a process for collecting evidence for an incident is depicted in accordance with an illustrative embodiment. The process illustrated in FIG. 8 can be implemented in evidence manager 206 in FIG. 2 or evidence manager 300 in FIG. 3. The different steps in this process can be implemented using at least one of hardware or software. When software is used, these steps can be implemented in instructions taking the form of program code that can be run on a processor unit for a server computer, a client device, a computer system, or some other data processing system.

The process begins by creating an incident record for an incident (step 800). Step 800 can be performed during the incident or after the occurrence of the incident. The incident record can include information about the incident including description, date, time, location, and other suitable information. This record is stored and maintained by an incident manager. The incident record also serves as an index core for evidence records.

Next, an incident manager creates an evidence record (step 802). The evidence record is used to store evidence collected for the incident. The first evidence record may have a location based on the location of the incident. Other evidence records can have locations based on witnesses identified for the incident. Subsequent evidence records can be created in response to requests from an evidence analyzer.

The incident manager generates a request to collect evidence (step 804). In step 804, the request may be a message sent to an evidence collector. In other illustrative examples, the request may be performed by sending an identification of the evidence record created in step 802. In other illustrative examples, the evidence analyzer can generate the request after the incident manager creates an evidence record.

The evidence collector collects the evidence for the evidence record (step 806). In step 806, the evidence is collected from client devices identified in the witness zone corresponding to the evidence record. An evidence processor processes the evidence for analysis (step 808). The evidence analyzer analyzes the evidence (step 810). The evidence analyzer stores results from the analysis in the evidence record (step 812).

These results are stored along with the evidence used in evaluating the incident. A determination is made as to whether another evidence record should be created (step 814). This determination can be made based on various factors such as witness concentrations in a current witness zone for the evidence record being processed. For example, any evidence that has a probability greater than a threshold to identify the location of a known suspect can be used to automatically generate a new witness zone. This evidence may be, for example, a photo, a video, or other suitable type of evidence indicating the location of a suspect.

In another illustrative example, another factor may be used to identify new witness zone other than a concentration of witnesses. For example, the relative parts of a piece of evidence identified in a particular location may serve as a trigger to create a new witness zone. In step 814, if another evidence record is created, the process returns to step 802. Otherwise, the process terminates.

Figure 9:
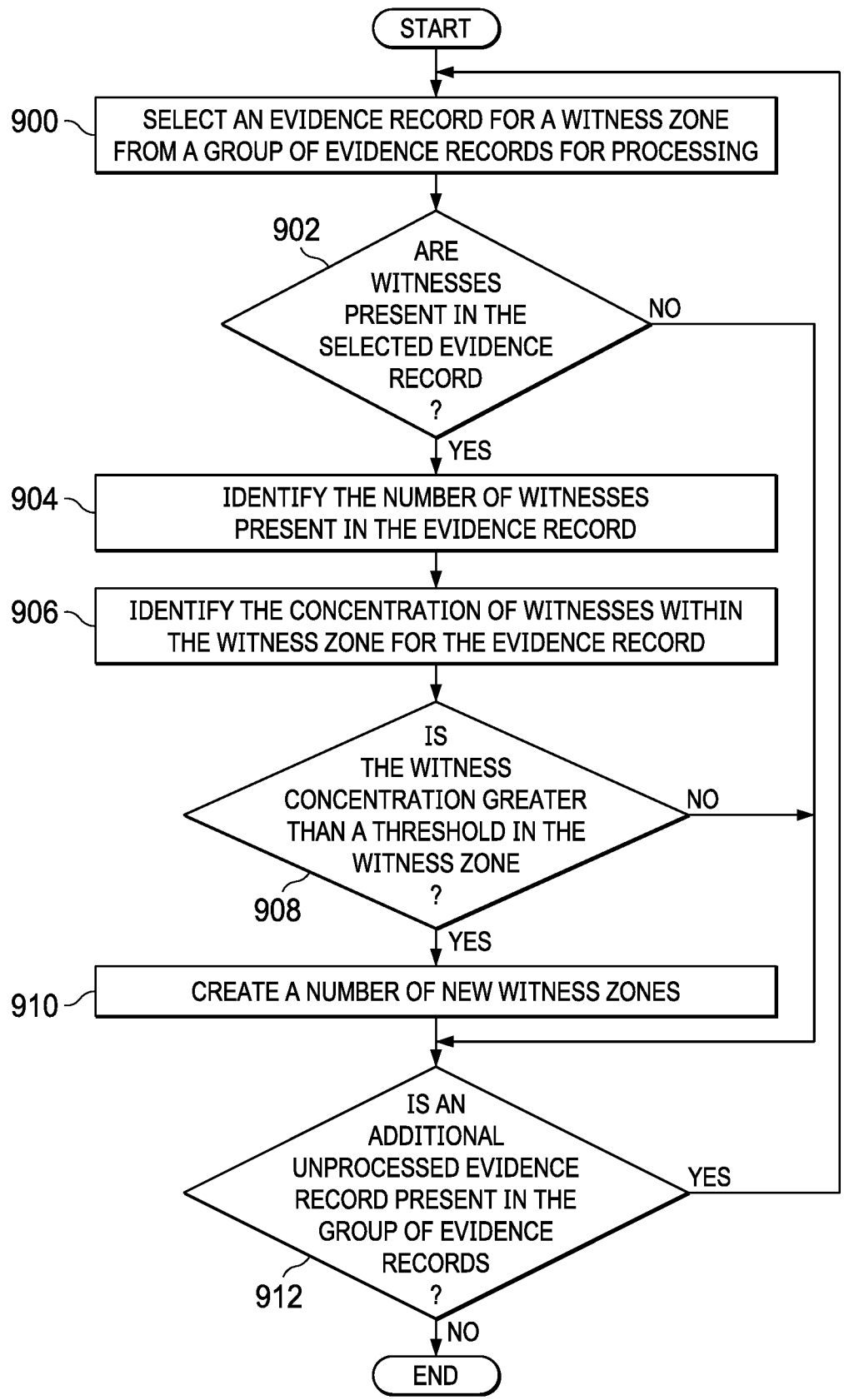
FIG. 9 is a flowchart of a process for identifying a new witness zone in accordance with an illustrative embodiment.

With reference next to FIG. 9, a flowchart of a process for identifying a new witness zone is depicted in accordance with an illustrative embodiment. The process illustrated in FIG. 9 can be implemented to analyze evidence in a component such as evidence manager 206 in FIG. 2, evidence manager 300 in FIG. 3, and, in particular, in evidence analyzer 310 in FIG. 3. The different steps in this process can be implemented using at least one of hardware or software. When software is used, these steps can be implemented in instructions taking the form of program code that can be run on a processor unit for a server computer, a client device, a computer system, or other data processing system.

The process beings by selecting an evidence record for a witness zone from a group of evidence records for processing (step 900). The process determines whether witnesses are present in the selected evidence record (step 902). The determination of whether witnesses are present can be performed in a number of different ways. For example, witnesses can be identified based on the number of different client devices from which evidence has been collected.

If witnesses are present, the process identifies the number of witnesses present in the evidence record (step 904). The process then identifies the concentration of witnesses within the witness zone for the evidence record (step 906). The concentration can be identified in a number of ways. For example, the cluster of witnesses can be identified using a cluster analysis such as k-means clustering, centroid-based clustering, or some other type of clustering process. Each cluster can be processed to identify a witness concentration.

In one illustrative example, witness concentration can be calculated using a point density system, where areas within a configurable radius can be identified to be used in an overall comparison. A determination is made as to whether the witness concentration is greater than a threshold in the witness zone (step 908). The threshold in step 908 may be set by a user or a system administrator. The threshold can be set based on a historical record of when a previously selected witness threshold provides for increased evidence of identification.

If the concentration is greater than a threshold, the process creates a number of new witness zones (step 910). In step 910, more than one cluster may be present in which the concentration of witnesses is greater than the threshold. In this case, more than one new witness zone is created.

A determination is made as to whether an additional unprocessed evidence record is present in the group of evidence records (step 912). If an additional unprocessed evidence record is present, the process returns to step 900. Otherwise, the process terminates. With reference again to step 902, if witnesses are not present, the process proceeds to step 912.

Figure 10:
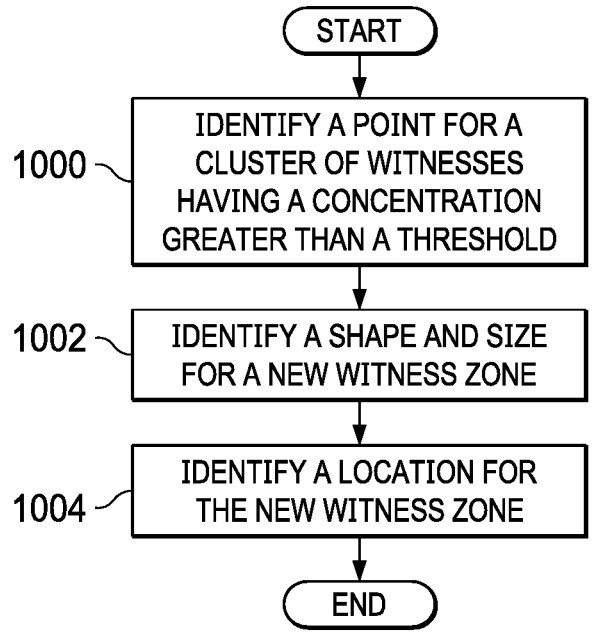
FIG. 10 is a flowchart of process for creating a witness in accordance with an illustrative embodiment.

With reference now to FIG. 10, a flowchart of process for creating a witness is depicted in accordance with an illustrative embodiment. The process illustrated in FIG. 10 is an example of one implementation for creating a witness in step 910 in FIG. 9.

The process begins by identifying a point for a cluster of witnesses having a concentration greater than a threshold (step 1000). The point in step 1000 is a point in the cluster of witnesses. This point can be a centroid for the cluster.

The process identifies a shape and a size for a new witness zone (step 1002). The shape may be a circle, a rectangle, a pentagon, an irregular shape, or some other suitable type of shape. In the illustrative example, a circular shape may have less priority as the distance increases from where evidence was identified. Further, the radius and shape can be determined by travel of direction evidence. The travel of direction evidence may be evidence indicating the direction of travel of a suspect or person of interest. As depicted, radius or size of new zones can be determined by the witness and evidence concentration. Further, smaller concentrations can result in larger witness zones. In other words, the witness zone can increase in size as the witness concentration increases. In still another illustrative example, the shape and size of the witness zone and can be based on city blocks or blocks defined by streets intersections. The shape and size of a witness zone can also be based on structural or environmental features such as tree lines, lakes, rivers, or other suitable structural or environmental borders.

The process identifies a location for the new witness zone (step 1004). In step 1004, the location of the new witness zone is selected to result in at least one of reducing an amount of overlap between the new witness zone and the group of witness zones, or based on a direction of travel of a person of interest, jurisdictional authority, or some other suitable factor. By reducing the overlap, duplication of evidence collected may be reduced. Further, based on the direction of travel of a person of interest, the new witness zone may be placed in a location to obtain evidence about the person. The placement of the new witness zone also may be restricted based on the authority to gather evidence in different locations. The strength of evidence also may be used to identify the placement of the witness zone. Further, the placement also may be affected by the environment. For example, the witness zone placement may be made to minimize overlap with a lake, a police station, a city line, a county line, or other environmental factor.

Figure 11:
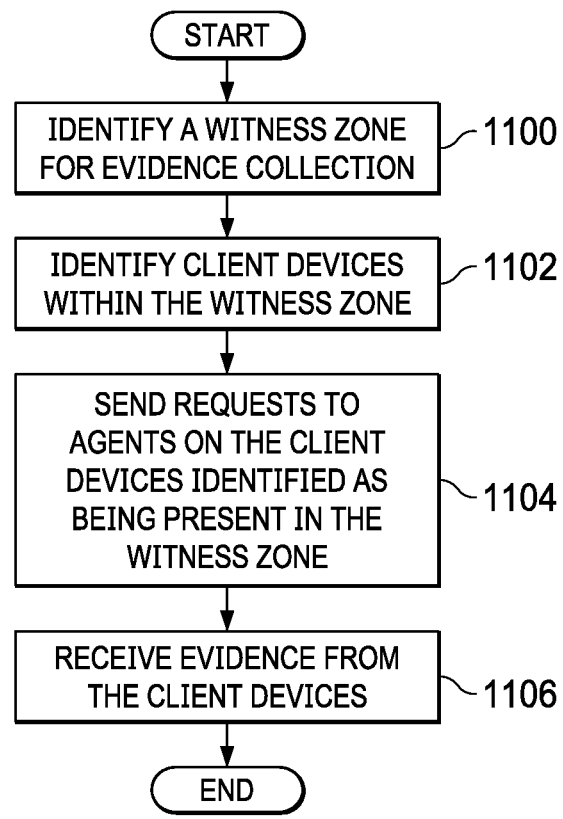
FIG. 11 is a flowchart of a process for collecting evidence in accordance with an illustrative embodiment.

With reference next to FIG. 11, a flowchart of a process for collecting evidence is depicted in accordance with an illustrative embodiment. The process illustrated in FIG. 11 can be implemented in evidence manager 206 in FIG. 2 or evidence manager 300 in FIG. 3. Some or all of these steps can be implemented as part of evidence collector 306 in evidence manager 300 in FIG. 3. The different steps in this process can be implemented using at least one of hardware or software. When software is used, these steps can be implemented in instructions taking the form of program code that can be run on a processor unit for a server computer, a client device, a computer system, or some other data processing system.

The process begins by identifying a witness zone for evidence collection (step 1100). In step 1100, the witness zone can be identified in a number of different ways. For example, the witness zone may be identified in response to a request for evidence. This request can be made by an incident manager and evidence analyzer for particular evidence associated with the witness zone. In another illustrative example, the witness zone can be identified by locating an evidence record that has not yet been processed for the evidence collection.

Step 1100 may be performed to identify client devices that were within the witness zone and during the incident, before the incident, or after the incident. In this manner, evidence can be collected to identify actions prior to the incident. Further, real-time collection of evidence can be performed if the incident is still occurring. Also, forensic evidence or evidence identifying locations of suspects can be identified after the incident.

The process identifies client devices within the witness zone (step 1102). All available client devices for evidence collection can register and provide information indicating current locations. For example, heart beat signals can be transmitted periodically that identify the client device in the location of the client device. Client devices within the witness zone can be identified in step 1102 with the current locations of the client devices.

Next, the process sends requests to agents on the client devices identified as being present in the witness zone (step 1104). The process receives evidence from the client devices (step 1106). The process terminates thereafter. This process can be repeated any number of times as needed for the same or different witness zone to collect evidence.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, in step 908 in FIG. 9, other factors can be taken into account in addition to the concentration of witnesses. For example, the time of when evidence or a witness is identified can be taken into consideration. The relevance of evidence, the witness, or a combination thereof also can be considered in determining whether to create a new witness zone. In still other illustrative examples, whether a new witness zone is created can be based on factors other than the concentration of witnesses. For example, the relevance of a piece of evidence identified can also be used to determine whether to create a new witness zone. The location of the evidence can be used as a point from which to create a new witness zone with this type of implementation. Thus, new witness zone can be identified using at least one of witness concentration, relevancy of evidence, or other suitable factors that may increase the ability to identify evidence.

Figure 12:
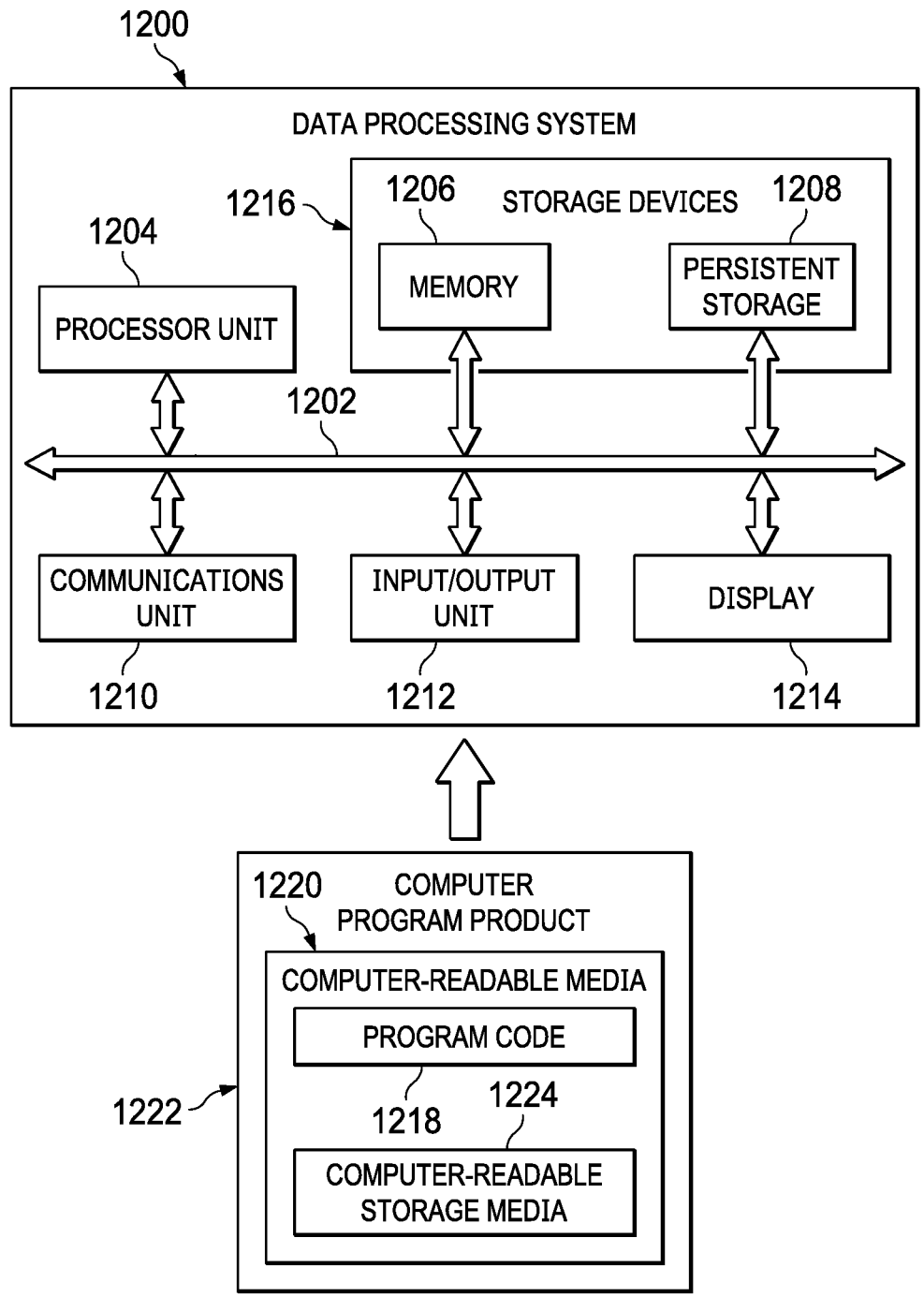
FIG. 12 is a block diagram of a data processing system in accordance with an illustrative embodiment.

Turning now to FIG. 12, a block diagram of a data processing system is depicted in accordance with an illustrative embodiment. Data processing system 1200 may be used to implement server computer 104, server computer 106, client devices 110, computer system 208, and computer system 302 in FIGS. 1-3. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid state hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 may be transferred to data processing system 1200 using a computer-readable signal media. The computer-readable signal media may be, for example, a propagated data signal containing program code 1218. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Thus, illustrative embodiments of the present invention provide a computer implemented method, computer system, and computer program product for managing evidence. In the illustrative examples, one or more technical solutions enable a technical effect of automatically identifying potential witnesses regardless of when the incident occurred, versus depending on witnesses voluntarily coming forward to share information. Further, the privacy of potential witnesses can be preserved and evidence collection is secure, thus eliminating the fear of reprisal against witnesses and evidence collection which exists today. The potential witnesses can be kept secure as needed using evidence management system 202. For example, the identity of witnesses can be encrypted unless otherwise needed.

Further, illustrative examples can obtain evidence created within a short period of when the incident occurred, versus relying on witnesses' memories which degrade over time or may be impaired due to trauma or external influences. For example, external influences may include what the witnesses have read, heard, or seen pertaining to the incident. Further, the evidence collected in the illustrative examples can take the form of digital data that is unchanged, versus the human memory which can be swayed by personal bias or external influences. The digital data can include, for example, text, photos, video, voice memos, or other types of suitable data.

Further, witness pools can be increased utilizing an evidence management system in the depicted examples. Further, the identification of witnesses can increase the number of potential witnesses. Another technical effect can include increasing the amount and quality of evidence as compared to currently used techniques in which identification by law enforcement can be skewed by biases of particular individuals.

Further, identifying witnesses and capturing evidence during an incident can occur resulting in an increase in the overall quality of evidence as compared to identifying witnesses and collecting evidence after an incident. Further, the illustrative examples provide a technical solution that increases the capability to capture and process large amounts of evidence and witness data, thus providing instant insight and recommendations in contrast to current manual processes of identifying witnesses and collecting evidence which are time-consuming and costly. Current techniques often limit the number of witnesses that law enforcement personnel can process.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. An evidence management system comprising:
a computer system configured to:
store information about an incident in a group of evidence records for a group of witness zones, wherein the group of evidence records are associated with the group of witness zones for storing evidence for the incident, and wherein the group of witness zones are areas from which the evidence is collected, and wherein the computer system creates a new evidence record when a new witness zone not covered by an existing evidence record in the group of evidence records is identified by analyzing the evidence, the new evidence record causing the computer system to collect the evidence for the incident from the new witness zone, and wherein the computer system identifies the new witness zone by selecting a location for the new witness zone that overlaps at least one witness zone in the group of witness zones when a concentration of witnesses in a current witness zone in the group of witness zones exceeds a threshold, and wherein the computer system selects the location for the new witness zone based on reducing an amount of overlap between the new witness zone and the group of witness zones;
collect the evidence for the incident from client devices in the group of witness zones based on the group of evidence records, wherein the evidence collected from the client devices comprises photographic evidence, video evidence, audio evidence, and textual evidence; and
analyze the evidence collected for the incident in the group of evidence records based on the group of witness zones from which the evidence was collected, enabling the computer system to reduce an amount of time to collect the evidence for the incident, wherein the computer system processes the evidence for analysis by performing audio-to-text conversion, optical character recognition, keyword identification, and object recognition.

2. The evidence management system of claim 1, wherein processing the evidence for analysis further comprises at least one of visual recognition, facial recognition, entity identification, and location identification.

3. The evidence management system of claim 1, wherein the computer system creates an incident record for the incident and the group of evidence records are associated with the incident record, wherein the incident record includes a date, a time, a location, and a description of the incident.

4. The evidence management system of claim 1, wherein in analyzing the evidence collected, the computer system performs identifying common keywords between pieces of the evidence.

5. The evidence management system of claim 1, wherein the computer system communicates with agents running on the client devices to collect the evidence from the client devices.

6. The evidence management system of claim 5, wherein a client device in the client devices preprocesses the evidence to identify relevant evidence in the evidence.

7. The evidence management system of claim 6, wherein the client device prioritizes sending of the evidence based on identifying the relevant evidence.

8. The evidence management system of claim 6, wherein the client device records the information about the evidence selected from at least one of a time stamp or a location of the client device.

9. The evidence management system of claim 8, wherein the client device identifies desired evidence for the incident based on instructions from a server running on the computer system, enabling reducing resources used on the computer system to process the evidence for the incident.

10. The evidence management system of claim 1, wherein the evidence collected from the client devices further comprises at least one of a document, a text message, an email message, global positioning system information, a scent, atmospheric pressure, temperature, or humidity.

11. The evidence management system of claim 1, wherein the computer system includes a question answering system.

12. The evidence management system of claim 1, wherein the incident is selected from a group comprising a crime, a civil wrong, an automobile accident, a tort, a breach of contract, a breach of trust, a football play, a portion of a sporting event, and a fraud investigation.

13. An evidence management system comprising:
a computer system configured to:
collect information for an incident from client devices in a group of witness zones identified for the incident;
store evidence collected for the incident from the client devices in a group of evidence records corresponding to the group of witness zones from which the evidence was collected, wherein the evidence collected from the client devices comprises photographic evidence, video evidence, audio evidence, and textual evidence, and wherein the computer system processes the evidence for analysis by performing audio-to-text conversion, optical character recognition, keyword identification, and object recognition; and
create a new evidence record when a new witness zone not covered by an existing evidence record in the group of evidence records is identified in which the new evidence record is for the evidence collected for the incident from the new witness zone, enabling the computer system to collect more relevant evidence for the incident, wherein the computer system identifies the new witness zone by selecting a location for the new witness zone that overlaps at least one witness zone in the group of witness zones when a concentration of witnesses in a current witness zone in the group of witness zones exceeds a threshold, and wherein the computer system selects the location for the new witness zone based on reducing an amount of overlap between the new witness zone and the group of witness zones.

14. The evidence management system of claim 13, wherein the computer system analyzes the evidence collected for the incident in the group of evidence records based on the group of witness zones from which the evidence was collected, enabling the computer system to increase an amount of the evidence collected for the incident.

15. A method for managing evidence, the method comprising:

creating, by a computer system, a group of evidence records for a group of witness zones, wherein an evidence record identifies a witness zone for evidence;

collecting, by the computer system, the evidence from client devices for an incident based on the group of evidence records, wherein the evidence collected from the client devices comprises photographic evidence, video evidence, audio evidence, and textual evidence;

storing, by the computer system, the evidence collected in the group of evidence records; and analyzing, by the computer system, the evidence collected for the incident in the group of evidence records based on the group of witness zones from which the evidence was collected, enabling the computer system to increase an amount of the evidence collected for the incident, wherein the computer system processes the evidence for analysis by performing audio-to-text conversion, optical character recognition, keyword identification, and object recognition, and wherein the computer system creates a new evidence record when a new witness zone not covered by an existing evidence record in the group of evidence records is identified by analyzing the evidence, the new evidence record causing the computer system to collect the evidence for the incident from the new witness zone, and wherein the computer system identifies the new witness zone by selecting a location for the new witness zone that overlaps at least one witness zone in the group of witness zones when a concentration of witnesses in a current witness zone in the group of witness zones exceeds a threshold, and wherein the computer system selects the location for the new witness zone based on reducing an amount of overlap between the new witness zone and the group of witness zones.

16. The method of claim 15, wherein:
processing the evidence for analysis optical further comprises at least one of visual recognition, facial recognition, entity identification, and location identification.

17. The method of claim 15, wherein the incident is selected from a group comprising a crime, a civil wrong, an automobile accident, a tort, a breach of contract, a breach of trust, a football play, a portion of a sporting event, and a fraud investigation.

18. A computer program product for managing evidence, the computer program product comprising:
a non-transitory computer-readable storage media;

first program code, stored on the non-transitory computer-readable storage media, for creating a group of evidence records for a group of witness zones, wherein an evidence record identifies a witness zone for the evidence;

second program code, stored on the non-transitory computer-readable storage media, for collecting the evidence from client devices for an incident based on the group of evidence records, wherein the evidence collected from the client devices comprises photographic evidence, video evidence, audio evidence, and textual evidence;

third program code, stored on the non-transitory computer-readable storage media, for storing the evidence collected in the group of evidence records; and fourth program code, stored on the non-transitory computer-readable storage media, for analyzing the evidence collected for the incident in the group of evidence records based on the group of witness zones from which the evidence was collected, enabling a computer system to increase an amount of the evidence collected for the incident, wherein the computer system processes the evidence for analysis by performing audio-to-text conversion, optical character recognition, keyword identification, and object recognition, and wherein the computer system creates a new evidence record when a new witness zone not covered by an existing evidence record in the group of evidence records is identified by analyzing the evidence, the new evidence record causing the computer system to collect the evidence for the incident from the new witness zone, and wherein the computer system identifies the new witness zone by selecting a location for the new witness zone that overlaps at least one witness zone in the group of witness zones when a concentration of witnesses in a current witness zone in the group of witness zones exceeds a threshold, and wherein the computer system selects the location for the new witness zone based on reducing an amount of overlap between the new witness zone and the group of witness zones.

19. The computer program product of claim 18, wherein the incident is selected from a group comprising a crime, a civil wrong, an automobile accident, a tort, a breach of contract, a breach of trust, a football play, a portion of a sporting event, and a fraud investigation.

* * * * *